United States Patent
Shin

(10) Patent No.: US 9,766,735 B2
(45) Date of Patent: Sep. 19, 2017

(54) TOUCH SENSING SYSTEM USING VARIED REFERENCE DATA VALUES TO DETECT A TOUCH AND METHOD THEREOF

(71) Applicant: LG DISPLAY CO.,LTD., Seoul (KR)

(72) Inventor: Sun Kyung Shin, Goyang-Si (KR)

(73) Assignee: LG DISPLAY CO., LTD., Seoul (KR)

( * ) Notice: Subject to any disclaimer, the term of this patent is extended or adjusted under 35 U.S.C. 154(b) by 15 days.

(21) Appl. No.: 14/317,717

(22) Filed: Jun. 27, 2014

(65) Prior Publication Data

US 2015/0002428 A1 Jan. 1, 2015

(30) Foreign Application Priority Data

Jun. 27, 2013 (KR) .......................... 10-2013-0074265

(51) Int. Cl.
*G06F 3/041* (2006.01)
*G06F 1/32* (2006.01)

(52) U.S. Cl.
CPC .......... *G06F 3/0412* (2013.01); *G06F 1/3218* (2013.01); *G06F 3/0416* (2013.01)

(58) Field of Classification Search
CPC ..... G06F 1/3218; G06F 3/0412; G06F 3/0416
USPC ................................................. 345/173, 174
See application file for complete search history.

(56) References Cited

U.S. PATENT DOCUMENTS

| | | | | |
|---|---|---|---|---|
| 6,459,424 B1* | 10/2002 | Resman | ................... | G06F 3/044 345/173 |
| 8,259,084 B2* | 9/2012 | Chang | ................... | G06F 3/0412 315/169.3 |
| 2006/0146038 A1* | 7/2006 | Park | ...................... | G06F 3/0412 345/173 |
| 2008/0158174 A1* | 7/2008 | Land | ...................... | G06F 3/0418 345/173 |
| 2010/0020029 A1* | 1/2010 | Park | ...................... | G06F 3/0412 345/173 |
| 2010/0156819 A1* | 6/2010 | Takahashi | ............... | G06F 3/044 345/173 |
| 2011/0037727 A1* | 2/2011 | Lee | ........................ | G06F 3/0416 345/174 |
| 2013/0050135 A1* | 2/2013 | Stewart | ............... | G06F 3/04895 345/174 |
| 2013/0106735 A1* | 5/2013 | Lee | ......................... | G06F 3/044 345/173 |

FOREIGN PATENT DOCUMENTS

CN 101965549 A 2/2011

OTHER PUBLICATIONS

Office Action dated Sep. 27, 2016 for Chinese Application No. 201410301550.7, 9 pages.

* cited by examiner

*Primary Examiner* — Ram Mistry
(74) *Attorney, Agent, or Firm* — Seed Intellectual Property Law Group LLP

(57) ABSTRACT

A touch sensing system includes: a panel portion defined into a plurality of sensing regions; a memory portion which includes a first memory configured to store sensing data obtained from each of the sensing regions of the panel portion and a second memory configured to store reference data; and a control portion which includes a calculator configured to compare the sensing data of each sensing region with the reference data and a touch determiner configured to determine generation of a touch based on output of the calculator.

12 Claims, 4 Drawing Sheets

TOUCH SENSING SYSTEM USING VARIED REFERENCE DATA VALUES TO DETECT A TOUCH AND METHOD THEREOF

The present application claims priority under 35 U.S.C. §119(a) to Korean Patent Application No. 10-2013-0074265 filed on Jun. 27, 2013, which is hereby incorporated by reference in its entirety.

BACKGROUND

Field of the Disclosure

The present application relates to a touch sensing system. More particularly, the present application relates to touch sensing system and method capable of being efficiently switched from an idle state into a wake-up state.

Description of the Related Art

Most electrical appliances include a variety of internal and/or external input devices. Each of the electrical appliances inputs commands through the input devices and performs a variety of functions corresponding to the input commands. The input devices are variously implemented according to input modes. Representative examples of input devices, including a key pad, a mouse etc., are being used. Recently, touch panels (TSPS) are being increasingly used as the input devices. The touch panel inputs the command by sensing a touch position of a contact object.

In general, the touch panel is disposed on the surface of a display device, such as a cathode ray tube (CRT), a liquid crystal display (LCD) device, a plasma display panel (PDP), an electroluminescent (EL) device or other devices, in order to sense a touch position of a contact object. An input device using the touch panel can input a command from a user by enabling the user to touch a fixed position of the touch panel with a contact object, such as a finger, a stylus pen or others.

If the touch panel is touched in an idle state that a system is not driven, the touch panel detects whether or not it is touched, and enables the system to be switched from the idle state into a wake-up state according the detected resultant. In accordance therewith, the system operates in a normal state.

However, a touch sensing system of the related art for detecting whether or not the touch panel is touched must perform a touch sensing operation only in the wake-up state, which is periodically set in a fixed lengthy interval by a software. Due to this, power consumption of the related art touch sensing system must increase.

Also, the related art touch sensing system with the touch panel performs the detection of a touch using only a fixed reference data. Meanwhile, an in-cell touch panel becomes weaker against noises according to temperature rise and external environment change, due to its structure of including an internal capacitor.

The noises can cause a sensing level deviation between nodes on the in-cell touch panel. Also, a detention error must be generated at a fixed node due to the sensing level deviation. Due to this, reliability of the in-cell touch panel for the touch detection must deteriorate.

SUMMARY

According to a general aspect of the present embodiment, a touch sensing system includes: a panel portion defined into a plurality of sensing regions; a memory portion which includes a first memory configured to store sensing data obtained from each of the sensing regions of the panel portion and a second memory configured to store reference data; and a control portion which includes a calculator configured to compare the sensing data of each sensing region with the reference data and a touch determiner configured to determine generation of a touch based on output of the calculator.

A touch sensing method according to another general aspect of the present embodiments includes: correcting sensing data from a panel portion in sensing regions; comparing the sensing data of each sensing region with reference data; and determining that a touch is detected, when the sensing data is not less than the reference data.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated herein and constitute a part of this application, illustrate embodiment(s) of the present disclosure and together with the description serve to explain the disclosure. In the drawings.

DETAILED DESCRIPTION OF THE EMBODIMENTS

Figure 1:
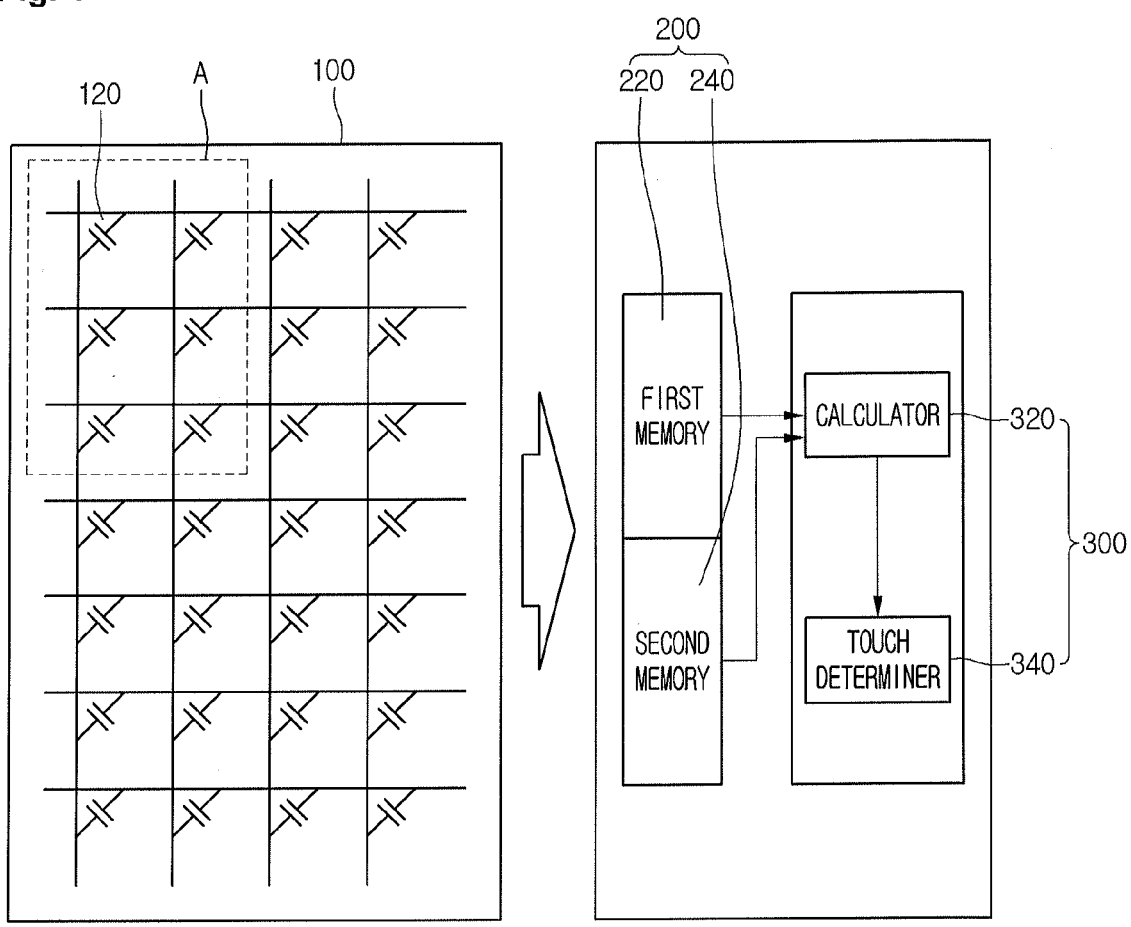
FIG. 1 is a block diagram showing a touch sensing system according to an embodiment of the present disclosure.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device may be expressed to be exaggerated for the sake of convenience in the drawings. Wherever possible, the same reference numbers will be used throughout this disclosure including the drawings to refer to the same or like parts.

Figure 2:
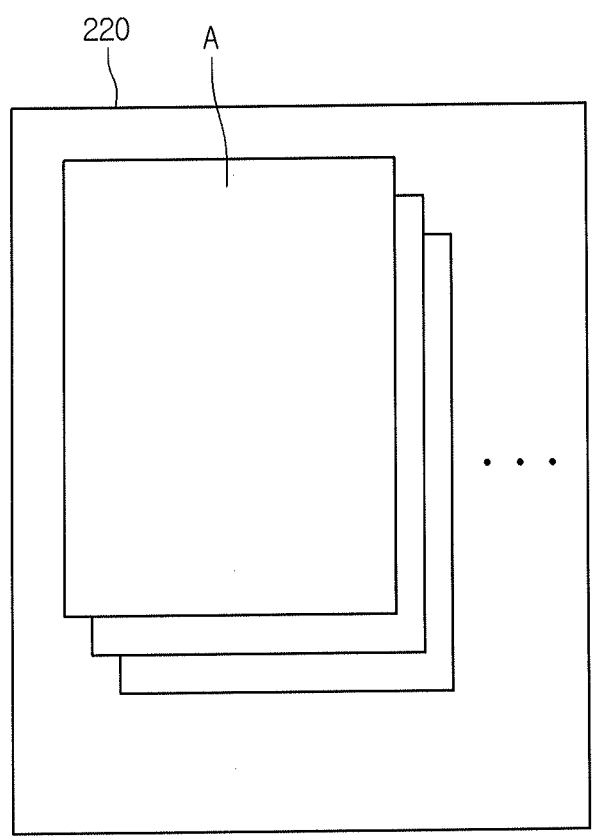
FIG. 2 is a memory map showing sensing data stored in a first memory of the touch sensing system according to an embodiment of the present disclosure.
Figure 3:
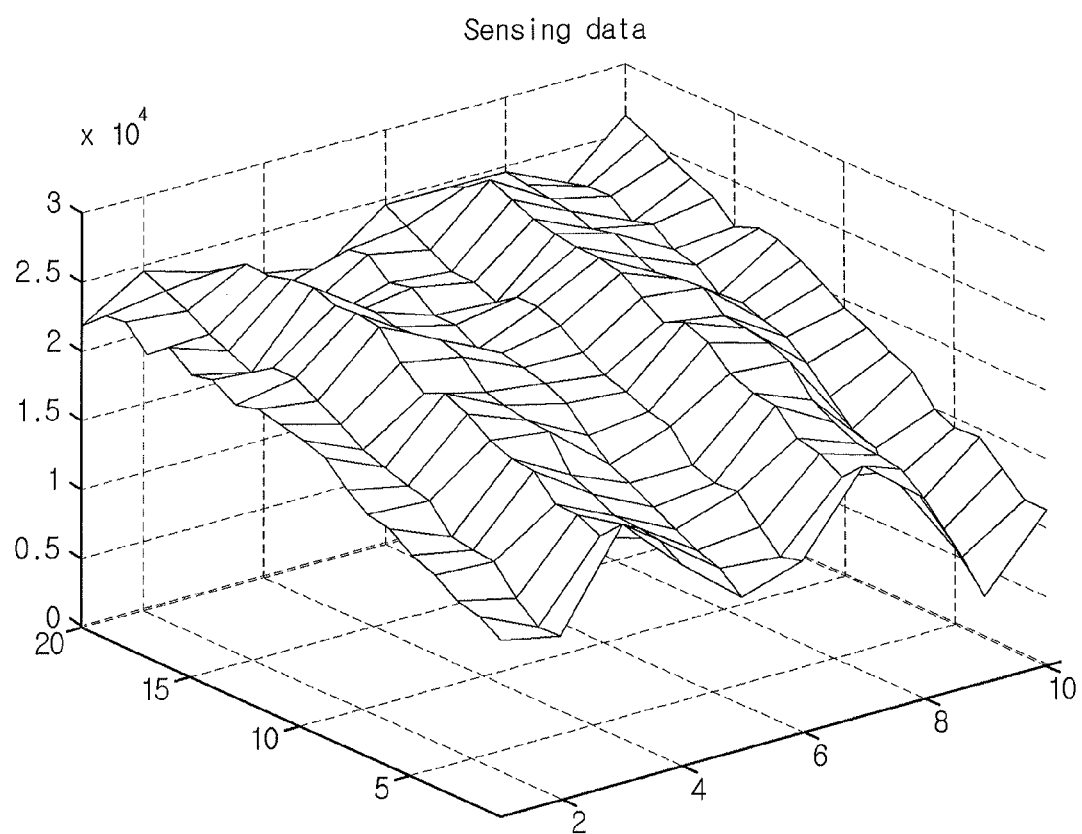
FIG. 3 is a data sheet illustrating sensing data values, which are obtained from a touch panel of the touch sensing system according to an embodiment of the present disclosure.
Figure 4:
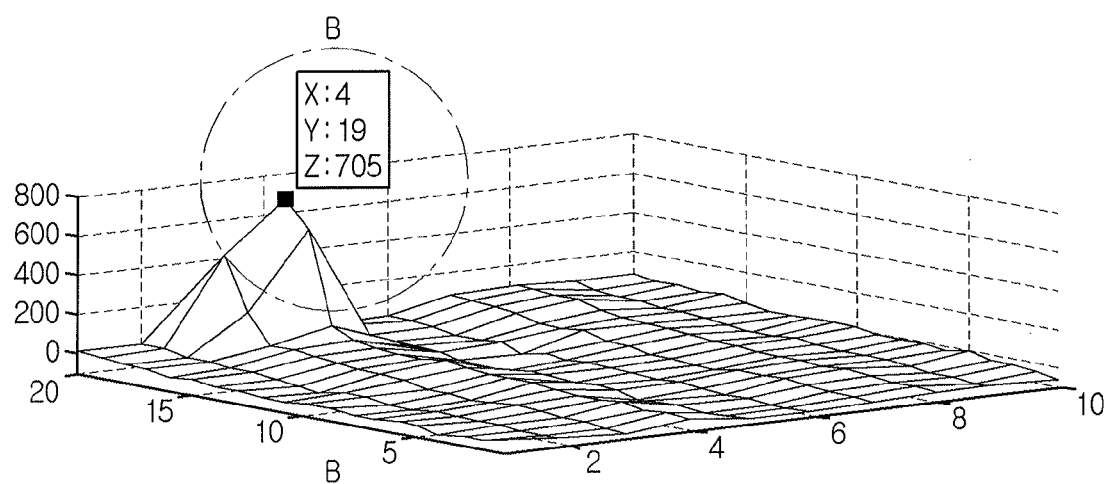
FIG. 4 is a data sheet illustrating sensing data deviations with a sensing region, in which a touch is generated, according to an embodiment of the present disclosure.
Figure 4:
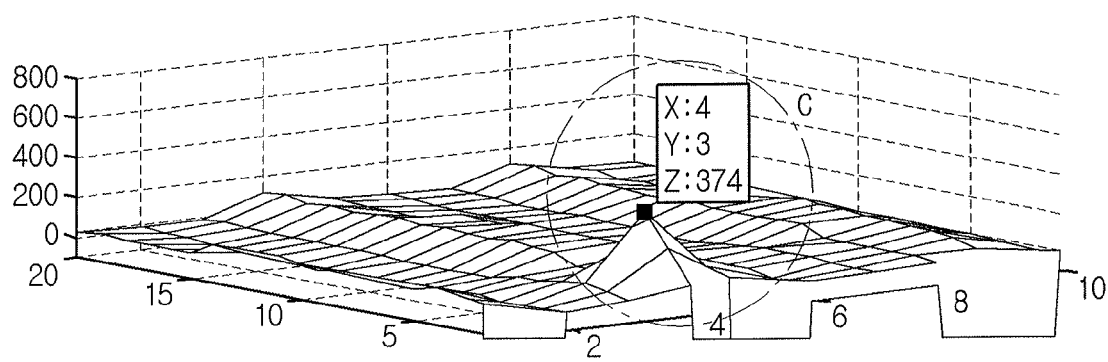
Figure 5:
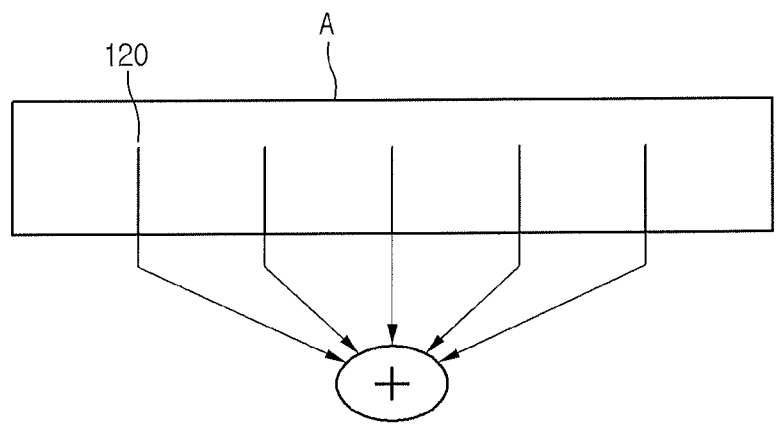
FIG. 5 is a schematic diagram illustrating a touch sensing method of the touch sensing system according to an embodiment of the present disclosure.

FIG. 1 is a block diagram showing a touch sensing system according to an embodiment of the present disclosure. FIG. 2 is a memory map showing sensing data stored in a first memory of the touch sensing system according to an embodiment of the present disclosure. FIG. 3 is a data sheet illustrating sensing data values which are obtained from a touch panel of the touch sensing system according to an embodiment of the present disclosure. FIG. 4 is a data sheet illustrating sensing data deviations with a sensing region, in which a touch is generated, according to an embodiment of the present disclosure. FIG. 5 is a schematic diagram illustrating a touch sensing method of the touch sensing system according to an embodiment of the present disclosure.

Referring to FIG. 1, a touch sensing system according to an embodiment of the present disclosure includes a panel portion 100 defined into a plurality of sensing regions A, a memory portion 200 configured with a first memory 220 and a second memory 240, and a control portion 300 configured with a calculator 320 and a touch determiner 340. The first memory 220 stores sensing data obtained from each of the sensing regions of the panel portion 100. The second memory 240 stores reference data. The calculator 320 comparison-calculates the sensing data obtained from each of the sensing regions and the reference data. The touch determiner 340 determines the generation of a touch on the basis of a calculated value.

The panel portion 100 can be a touch panel. In detail, the panel portion 100 can be an in-cell touch panel. The in-cell touch panel has a built-in structure with a touch sensor within a display cell. Also, the panel portion 100 can be a capacitive type touch panel. Alternatively, the panel portion 100 can be an on-cell touch panel. In other words, the panel portion 100 is not limited to the above-mentioned type touch panels.

Also, the panel portion 100 can be defined into the plurality of sensing regions A. Each of the sensing regions can be configured to include a plurality of sensing nodes 120. For example, a single sensing region A can include 6 sensing nodes 120. The sensing region A can be a tetragonal region.

Alternatively, the sensing region A can be a stripe region, which includes the sensing nodes 120 on one of horizontal and vertical axes. In different manner, the sensing region A can become one of a circular region and a polygonal region which each include a plurality of sensing nodes 120.

Such a panel portion 100 can generate a sensing data when a user touches. The sensing data generated in the panel portion 100 can be stored into the memory portion 200. The memory portion 200 can include the first memory 220 and the second memory 240.

The first memory 220 can store the sensing data generated in the panel portion 100. As shown in FIG. 2, the sensing data can be stored in the first memory 220 in such a manner as to be distinguished into the sensing regions A of the panel portion 100. For example, the first memory 220 can distinguish or group the sensing data into a sensing data group of a first sensing region A, another sensing data group of a second sensing region A and still another sensing data group of a third sensing region, and store the distinguished or grouped sensing data in its respective storing space.

Although all the sensing data grouped into the sensing regions A is stored in the first memory, the present disclosure is not limited to this. Alternatively, a plurality of memories for storing the respective sensing data group opposite to the respective sensing regions A can be included into the memory portion 200.

The second memory 240 can store the reference data. The reference data can be a reference value which is compared with the sensing data and determines whether or not a touch is generated. Such a reference data can be compared to the sensing data obtained from each of the sensing regions A.

The reference data can have different values each opposite to the sensing date obtained from the respective sensing region A. For example, the reference data compared to the sensing data of a first sensing region can have a first reference data value, and the reference data compared to the sensing data of a second sensing region can have a second reference data value. In other words, different reference data values from one another can be stored in the second memory 240.

A reference data value opposite to a sensing region in one edge area of the panel portion 100 can be set larger than another reference data value opposite to another sensing region in the central area of the panel portion 100.

As shown in FIGS. 3 and 4, a sensing data level obtained from the panel portion 100 is differently developed according to the sensing position on the panel portion 100. Actually, it is evident that a sensing data level 705 obtained from an edge area B of the panel portion 100 is developed larger than another sensing data level 374 obtained from the central area of the panel portion 100.

As such, in order to accurately detect whether or not the panel portion 100 is touched, the reference data must be differently set according to the sensing position on the panel portion 100. A reference data opposite to a sensing region B of the edge area of the panel portion 100 must be set larger than another reference data opposite to another sensing region C of the central area of the panel portion 100.

In view of this point, it is preferable to previously perform a measurement of sensing data levels for the panel portion 100 and set the reference data on the basis of the measured sensing data levels. As such, the reference data can be set or updated on the basis of the previously measured sensing data levels.

Returning to FIG. 1, the control portion 300 is used to compare the sensing data and the reference data and detect a touch. To this end, the calculator 320 configured to compare the sensing data and the reference data and the touch determiner 340 configured to determine the touch on the basis of the calculated value. The calculator 320 and the touch determiner 34 can be integrated into a single chip. Also, the memory portion 200 and the control portion 300 can be integrated into a single chip.

The calculator 320 can perform a calculation using a difference between the sensing data and the reference data. In detail, the calculator 320 reads-out the sensing data of each sensing region from the first memory 220. Also, the calculator 320 can match the read-out sensing data of each sensing region with the respective reference data and then perform the calculation.

The touch determiner 340 can determine the generation of a touch on the basis of the calculated value from the calculator 320. For example, when the sensing data is larger than the reference data, the touch determines that the panel portion 100 is touched. In order to enhance reliability of the touch detection, the touch determiner 340 can determine the generation of a touch through the following touch detection procedure.

The touch determiner 340 can count the number of sensing nodes which each generate the sensing data larger than the reference data. Also, the touch determiner 340 can determine that a sensing region on the panel portion 100 is touched, when the counted value is not less than a fixed critical value.

For example, it is assumed that three sensing nodes among total five nodes included in a sensing region each generate the sensing data larger than the reference data and the fixed critical value is set to "2". In this case, because the counted value of sensing nodes is larger than the fixed critical value, the touch determiner 34 can determine that a primary touch is detected.

In order to efficiently detect the touch regardless of external noises, the touch determiner 340 can determine whether or not a secondary touch is generated. The secondary touch means that the touch is continuously detected in the sensing region in which the primary touch is detected.

In other words, the touch determiner 340 performs two touch determination processes for one sensing region of the panel portion 100. As such, the touch determiner 34 can efficiently detect the generation of a touch regardless of noises, which are caused by temperature rise and external environment change.

Although it is explained that the touch determiner 340 performs two touch determination processes, the present disclosure is not limited to this. In other words, the touch determiner 340 can perform only one of the primary touch determination process and the secondary touch determination process and detect whether or not the panel portion 100 is touched.

Alternatively, the calculator 320 and the touch determiner 340 can compare a sum of the sensing data with the reference data and detect the generation of a touch.

As shown in FIG. 5, all sensing data values can be extracted from a sensing region A including 5 sensing nodes 120 and the sum of the extracted sensing data values can be calculated. If the sum of the extracted sensing data values is larger than the reference data, it is determined that a touch is detected.

Such a control portion 300 performs one of the above-mentioned touch detection processes and determines whether or not a touch is detected. Also, when it is determined that a touch is detected, the control portion 300 finally generates a wake-up signal which will be applied to a main system (not shown).

In this manner, the touch sensing system according an embodiment of the present disclosure includes a separated control portion for waking-up the main system. As such, power consumption of the main system can be minimized.

Returning to FIG. 1, if any touch is not detected, the control portion 300 can update the reference data stored in the second memory 240 on the basis of the sensing data stored in the first memory 220.

For example, if any touch is not detected during at least fixed cycles, the sensing data of the first memory 220 can be used as the reference data. In this case, the reference data stored in the second memory 240 is erased, and then new sensing data can be stored in the second memory 240. The fixed cycles can be set to be 2 cycles.

The mutual switchover of the first memory 220 and the second memory 240 can be performed by changing base addresses of the first memory 220 and the second memory 240. As such, the mutual switchover of the first and second memories 220 and 240 can be simply performed without additionally accessing the first and second memories 220.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

I claim:

1. A touch sensing system comprising:
   a panel portion defined into a plurality of sensing regions wherein each of the sensing regions includes a plurality of sensing nodes;
   a memory portion which includes a first memory configured to store sensing data obtained from each of the sensing regions of the panel portion and a second memory configured to store reference data including a plurality of reference data values each corresponding to a respective one of the plurality of sensing regions; and
   a control portion which includes:
      a calculator configured to compare the sensing data of each of the sensing regions, with a corresponding one of the reference data values, wherein the sensing data of each of the sensing regions is based on the plurality of sensing nodes within the respective sensing region; and
      a touch determiner configured to determine generation of a touch based on a difference between a specified value and a count of the number of sensing nodes within a sensing region that generate sensing data values larger than the respective reference data;
   wherein the reference data values in the plurality of sensing regions are differently set based a position of the sensing regions relative to an edge of the panel portion regardless of a touch position; and
   wherein only when a touch is not detected, the sensing data of the first memory is used as the reference data and the second memory is used to store the sensing data.

2. The touch sensing system of claim 1, wherein the reference data corresponding to the sensing region within an edge area of the panel portion is set larger than that corresponding to the sensing region within a central area of the panel portion.

3. The touch sensing system of claim 1, wherein when the sensing data is not less than the reference data, it is determined that the touch is detected.

4. The touch sensing system of claim 3, wherein when a number of sensing nodes each generating the sensing data not less than the reference data is not less than a fixed value, it is determined that the touch is detected.

5. The touch sensing system of claim 1, wherein when the sum of the sensing data is not less than the reference data, it is determined that the touch is detected.

6. The touch sensing system of claim 1, wherein the memory portion and the control portion are integrated into a single chip.

7. A touch sensing system comprising:
   a panel portion defined into a plurality of sensing regions wherein each sensing region includes a plurality of sensing nodes;
   a memory portion which includes a first memory configured to store sensing data obtained from each of the sensing regions of the panel portion and a second memory configured to store reference data; and
   a control portion which includes a calculator configured to compare the sensing data of each sensing region with the reference data, wherein the sensing data of each sensing region is based on the plurality of sensing nodes within the respective sensing region; and
      a touch determiner configured to determine generation of a touch based on a difference between a specified value and a count of the number of sensing nodes within a sensing region that generate sensing data values larger than the respective reference data;

wherein only when any touch is not detected during at least fixed detection cycles, the sensing data of the first memory is used as the reference data.

8. A touch sensing method comprising:

dividing a panel portion into a plurality of sensing regions, wherein each sensing region includes a plurality of sensing nodes;

collecting sensing data from a panel portion in the sensing regions;

setting reference data values in the plurality of sensing regions differently based on a position of the sensing regions relative to an edge of the panel portion regardless of a touch position;

comparing the sensing data of each sensing region with a respective reference data value corresponding to the sensing region, wherein the sensing data of each sensing region is based on the plurality of sensing nodes within the respective sensing region; and determining that a touch is detected based on a difference of between specified value and a count of the number of sensing nodes within a sensing region that generate sensing data values larger than the respective reference data;

wherein only when any touch is not detected, the sensing data of the first memory is used as the reference data and the second memory is used to store the sensing data.

9. The touch sensing method of claim 8, wherein when any touch is not detected, the reference data is updated with the sensing data.

10. The touch sensing method of claim 8, wherein when a number of sensing nodes each generating the sensing data not less than the reference data is not less than a fixed value, it is determined that the touch is detected.

11. The touch sensing method of claim 8, wherein when the sum of the sensing data is not less than the reference data, it is determined that the touch is detected.

12. A touch sensing system comprising:

a panel portion defined into a plurality of sensing regions, each of the plurality of sensing regions comprising a plurality of touch sensing nodes;

a memory portion that includes a first memory configured to store sensing data obtained from the plurality of sensing regions comprising the respective plurality of touch sensing nodes and a second memory configured to store reference data for the plurality of sensing regions; and a touch sensing control portion that compares the reference data to the sensing data of each of the plurality of sensing regions comprising the respective plurality of touch sensing nodes and detects a touch of the panel portion based on a difference between a specified value and a count of the number of sensing nodes within a sensing region that generate sensing data values larger than the respective reference data;

wherein only when a touch is not detected, the sensing data of the first memory is used as the reference data and the second memory is used to store the sensing data; and wherein the touch sensing control portion generates a wake-up signal for waking an idle system that has a separate control portion when the touch sensing control portion detects a touch of the panel portion based on a comparison of the reference data to a sensing region of the plurality of sensing regions comprising a respective plurality of touch sensing nodes.

* * * * *